(12) United States Patent
Koch

(10) Patent No.: US 10,072,794 B2
(45) Date of Patent: Sep. 11, 2018

(54) MOUNTING SYSTEM AND SET COMPRISING A MOUNTING SYSTEM OF SAID TYPE

(71) Applicant: Tormaxx GmbH, Moenchengladbach (DE)

(72) Inventor: Hubert Koch, Moenchengladbach (DE)

(73) Assignee: Tormaxx GmbH, Moechengladbach (DE)

( * ) Notice: Subject to any disclaimer, the term of this patent is extended or adjusted under 35 U.S.C. 154(b) by 19 days.

(21) Appl. No.: 15/111,955

(22) PCT Filed: Jan. 19, 2015

(86) PCT No.: PCT/DE2015/000010
§ 371 (c)(1),
(2) Date: Jul. 15, 2016

(87) PCT Pub. No.: WO2015/106754
PCT Pub. Date: Jul. 23, 2015

(65) Prior Publication Data
US 2016/0334057 A1 Nov. 17, 2016

(30) Foreign Application Priority Data

Jan. 17, 2014 (DE) .......................... 10 2014 000 401
Nov. 21, 2014 (DE) .......................... 10 2014 017 342

(51) Int. Cl.
*F16M 13/00* (2006.01)
*F16M 13/02* (2006.01)
(Continued)

(52) U.S. Cl.
CPC ............. *F16M 13/022* (2013.01); *F16B 2/02* (2013.01); *F16B 2/12* (2013.01); *F16B 47/006* (2013.01);
(Continued)

(58) Field of Classification Search
CPC ......... Y10T 24/21; F16M 13/02; F16M 11/14
(Continued)

(56) References Cited

U.S. PATENT DOCUMENTS

| 1,516,489 | A | 11/1924 | Barton |
| 2,489,535 | A | 11/1949 | Montague |
| 4,455,720 | A * | 6/1984 | Sutton ....................... F16B 2/08 |
| | | | 24/20 S |
| 5,276,949 | A | 1/1994 | Cordellini |
| 6,865,923 | B2 * | 3/2005 | Weschler ............... B21D 1/145 |
| | | | 72/457 |

(Continued)

FOREIGN PATENT DOCUMENTS

| DE | 20 2013 100 988 U1 | 4/2013 |
| EP | 2 386 771 A2 | 11/2011 |

(Continued)

OTHER PUBLICATIONS

International Search Report of PCT/DE2015/000010, dated Jul. 6, 2015.

*Primary Examiner* — Steven M Marsh
(74) *Attorney, Agent, or Firm* — Collard & Roe, P.C.

(57) ABSTRACT

The invention relates to a mounting system having a clamping element and a mating piece, which each have a shape-stable basic body and are attached to one another so as to be movable toward one another, by means of a bracing device, and between which there is a free space, in which an object can be disposed, wherein the mounting system is configured in such a manner that during a clamping process, the clamping element and the mating piece are moved toward one another on a straight line that leads through the center of the space.

11 Claims, 6 Drawing Sheets

Figure 1:
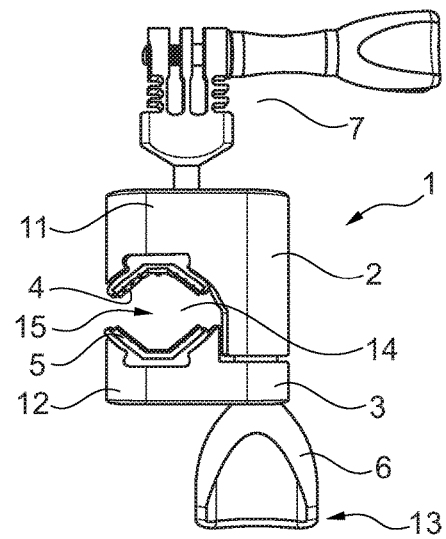

(51) Int. Cl.
  *F16B 47/00*  (2006.01)
  *F16B 2/02*   (2006.01)
  *F16B 2/12*   (2006.01)
  *F16M 11/20*  (2006.01)
  *G03B 17/56*  (2006.01)
  *F16B 2/08*   (2006.01)
  *F16B 2/10*   (2006.01)

(52) U.S. Cl.
  CPC ..... *F16M 11/2035* (2013.01); *F16M 11/2078* (2013.01); *F16M 13/00* (2013.01); *G03B 17/561* (2013.01); *F16B 2/08* (2013.01); *F16B 2/10* (2013.01); *F16M 2200/021* (2013.01)

(58) Field of Classification Search
  USPC ......... 248/228.1, 230.1, 228.8, 230.8; 24/19, 24/69 T, 69 WT
  See application file for complete search history.

(56) References Cited

U.S. PATENT DOCUMENTS

| | | | |
|---|---|---|---|
| 9,428,969 B2* | 8/2016 | Harbison | ............... E21B 17/012 |
| 2008/0296454 A1 | 12/2008 | Carnevali | |
| 2012/0097723 A1 | 4/2012 | Khatchatrian | |

FOREIGN PATENT DOCUMENTS

| | | |
|---|---|---|
| FR | 2 590 630 A1 | 5/1987 |
| WO | 2010/114370 A1 | 10/2010 |

* cited by examiner

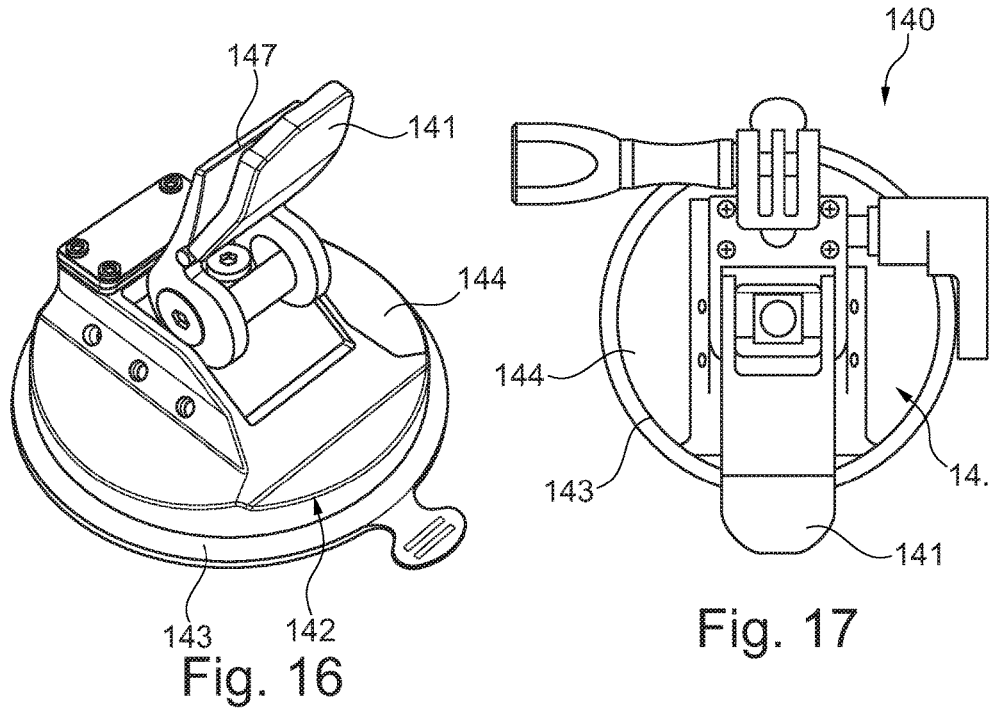
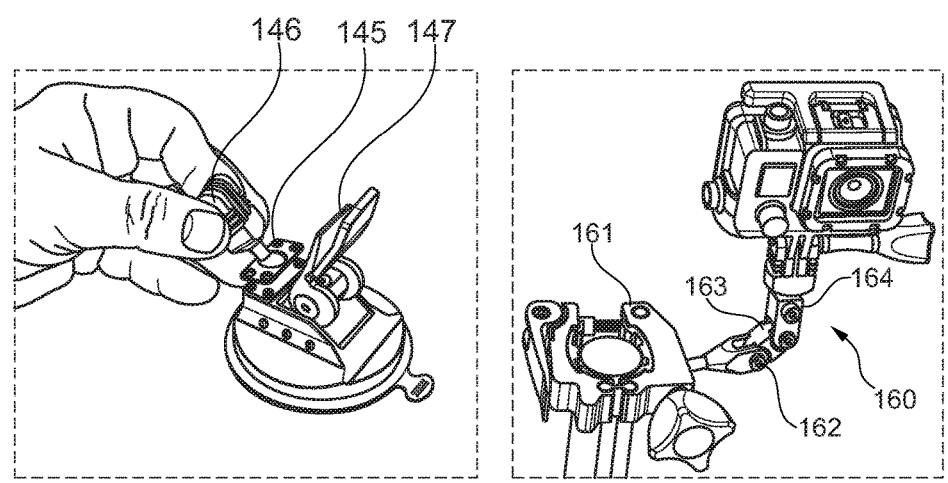

MOUNTING SYSTEM AND SET COMPRISING A MOUNTING SYSTEM OF SAID TYPE

CROSS REFERENCE TO RELATED APPLICATIONS

This application is the National Stage of PCT/DE2015/000010 filed on Jan. 19, 2015, which claims priority under 35 U. S. C. § 119 of German Application No. 10 2014 000 401.5 filed on Jan. 17, 2014 and German Application No. 10 2014 017 342.9 filed on Nov. 21, 2014, the disclosures of which are incorporated by reference. The international application under PCT article 21(2) was not published in English.

The invention relates to a mounting system and, in particular, to a mounting system in accordance with the preamble of claim 1, as well as to a set having such a mounting system. The mounting system is particularly suitable for attaching an electrical device, particularly a camera, to an object or to a surface, and diverse sets having such mountings as well as an extension apparatus for insertion into such mountings supplement the system.

Mountings for attaching electrical devices, particularly cameras, for example action cameras, are numerously known from the state of the art. They allow, for example with adjustable silicone bands of different lengths, attachment of a plastic mounting to a helmet, a bicycle handlebar, an outside mirror or a sailing mast.

It is the task of the present invention to improve such apparatuses known from the state of the art.

As a solution, different mounting systems are described in the claims, the specification, and the drawings.

Advantageous further developments are the object of the dependent claims.

All the mountings can have a ball socket, wherein here, the camera holder engages with a ball head. The camera holder is fixed in place in that a fixation element, such as a bracing lever or a rotational apparatus, acts on the ball head in the ball socket. It is advantageous if pivot recesses are provided in the ball pan. These can be disposed at a 90° angle, for example.

Individual elements or all elements of the different mountings can be made from aluminum.

Multiple exemplary embodiments of such mountings are shown in the drawing and will be described in greater detail below.

Figure 2:
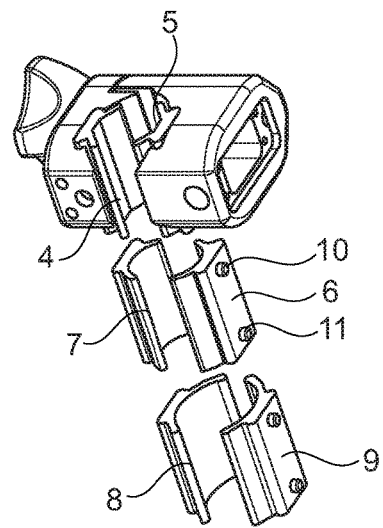
Figure 3:
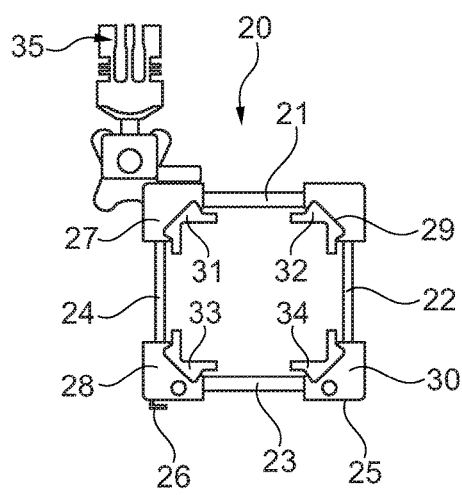
Figure 4:
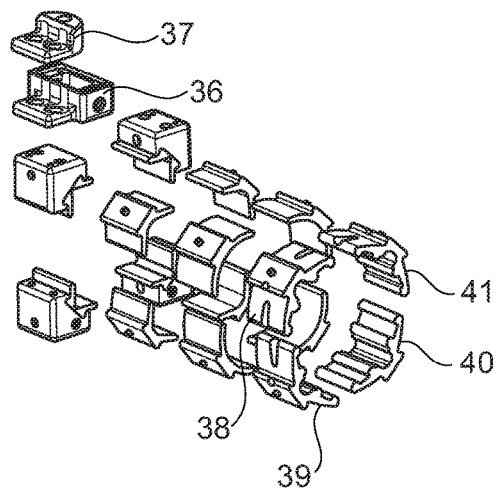
Figure 5:
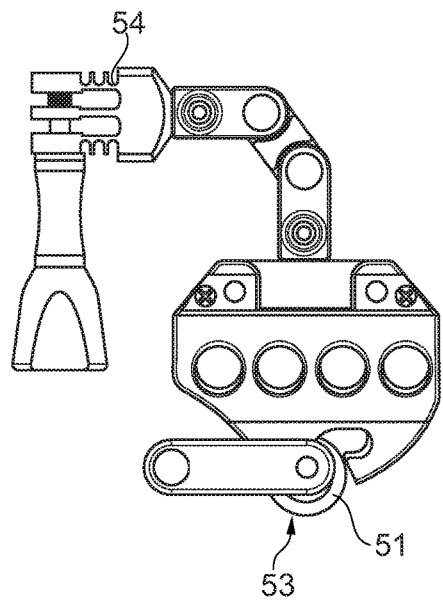
Figure 6:
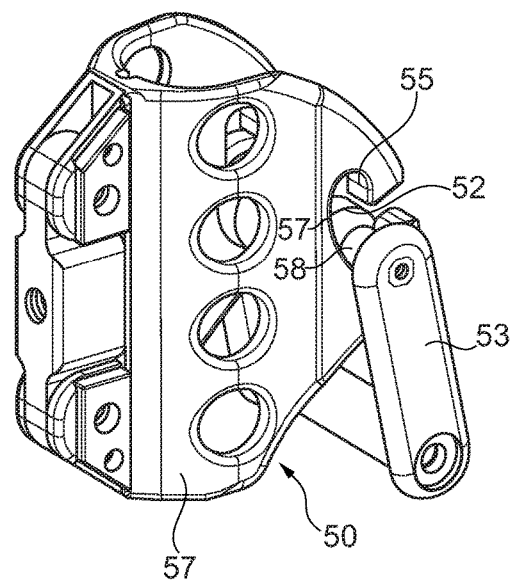
Figure 7:
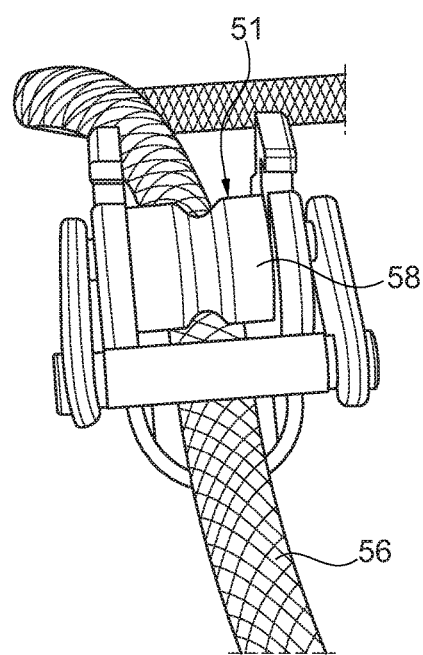
Figure 8:
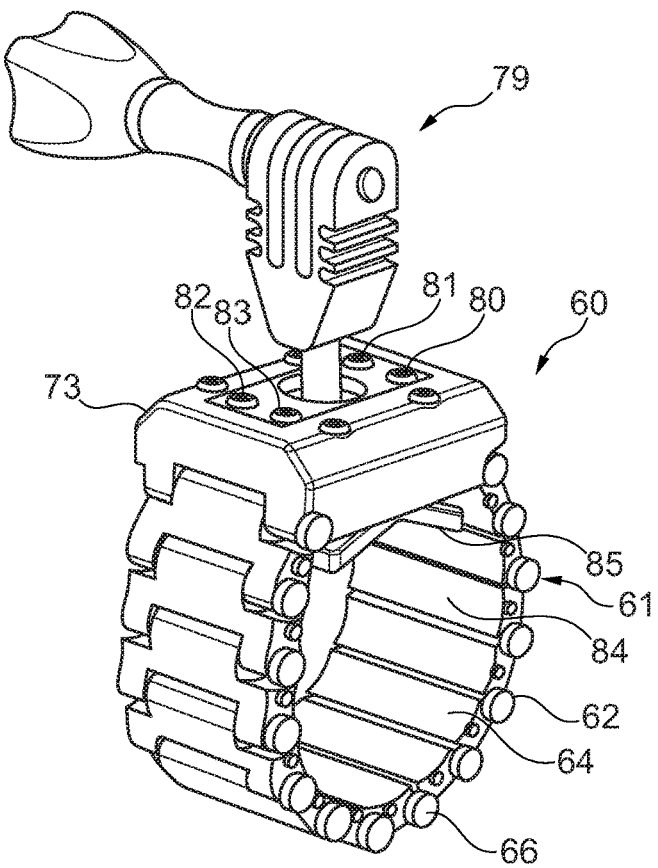
Figure 9:
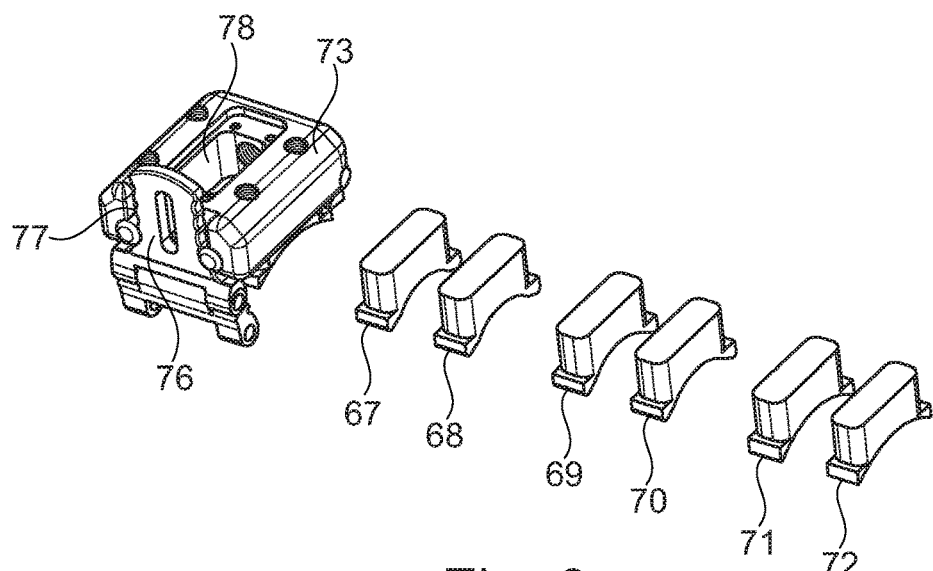
Figure 10:
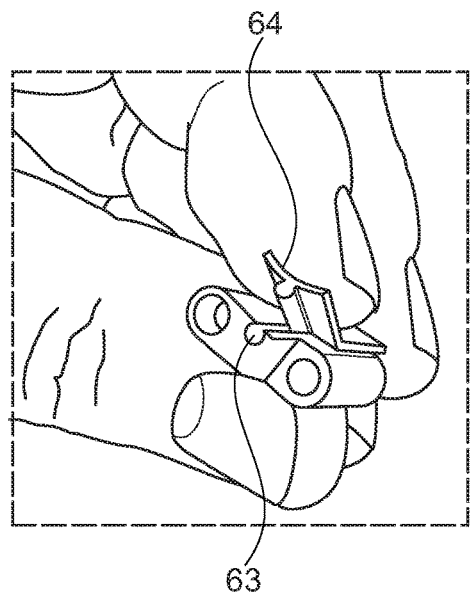
Figure 11:
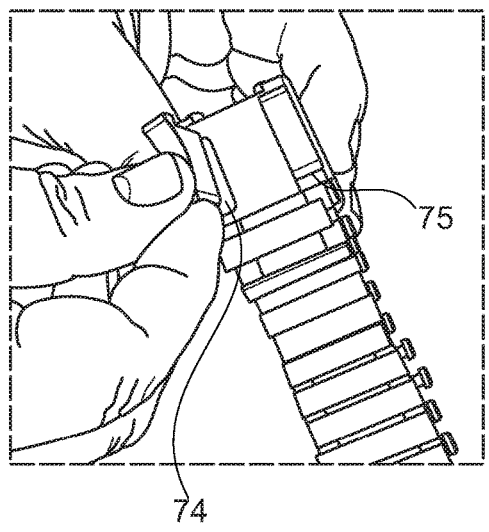
Figure 12:
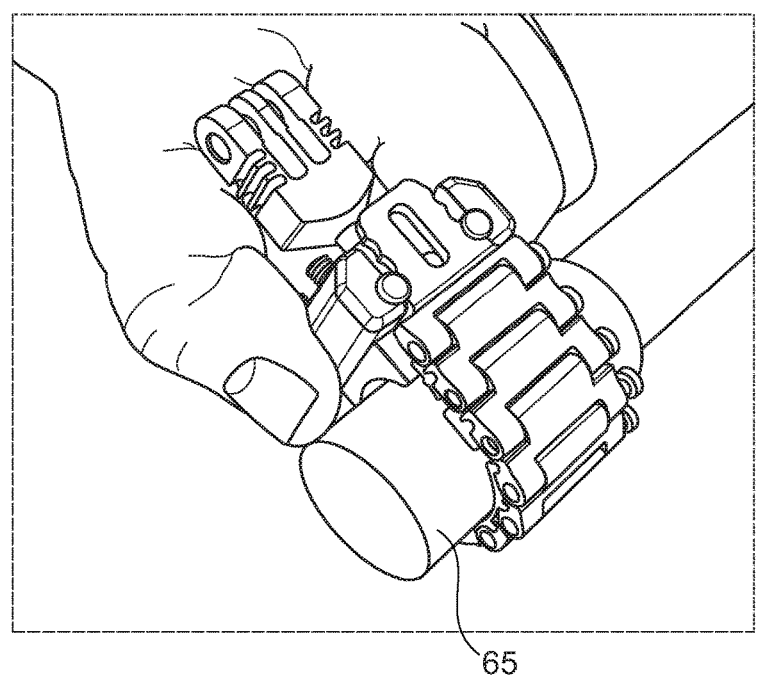
Figure 13:
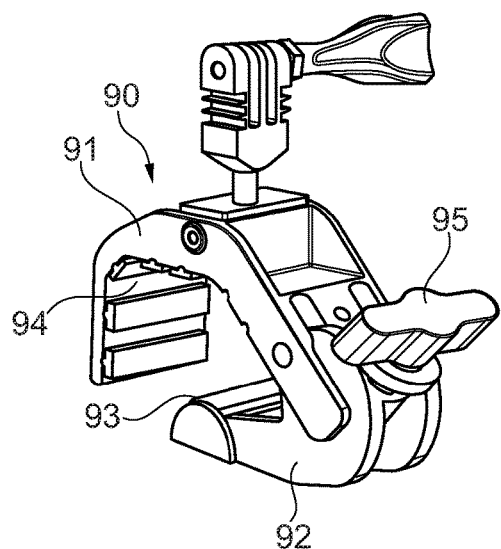
Figure 14:
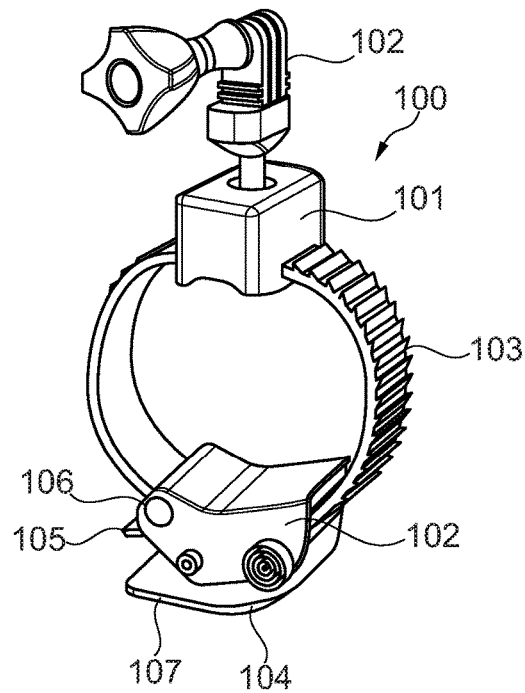
Figure 15:
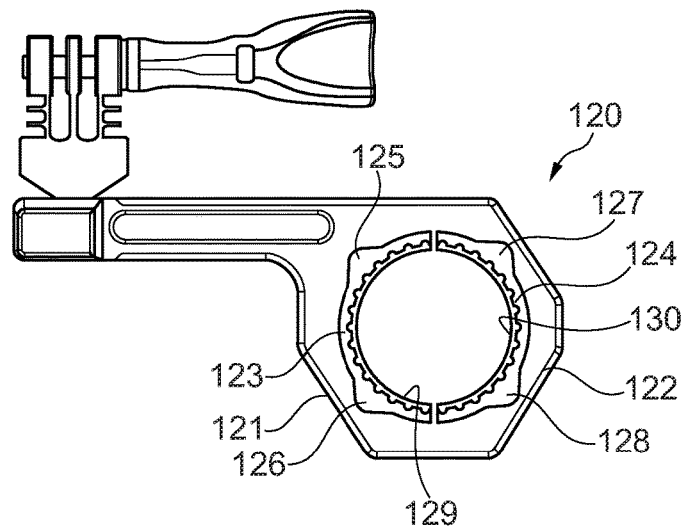

The figures show:

FIG. 1 a perspective side view of a Cero mounting,

FIG. 2 a schematic perspective representation of the mounting shown in FIG. 1, with interchangeable, latchable bracing jaws, FIG. 3 a perspective side view of a Quattro mounting, FIG. 4 a schematic representation of the elements of the mounting shown in FIG. 3, without the connecting rods, FIG. 5 a perspective side view of a Zwanziger mounting, FIG. 6 a schematic representation of the mounting shown in FIG. 5, FIG. 7 the use of the mounting shown in FIGS. 5 and 6, FIG. 8 a perspective side view of a BigT mounting, FIG. 9 an adjustable clamping element having different insertable bracing jaws, FIG. 10 the use of silicone-rubber molded parts in a chain element, FIG. 11 the use of a bracing jaw in a clamping element, FIG. 12 a perspective side view of the mounting shown in FIG. 8, FIG. 13 a perspective side view of a Shark mounting, FIG. 14 a perspective side view of a Proflex mounting, FIG. 15 a perspective side view of an iSHOXS mounting, FIG. 16 a perspective side view of an M1 mounting in the open state, FIG. 17 a top view of the mounting shown in FIG. 16, in the closed state, FIG. 18 the use of the mounting shown in FIG. 16 with a camera holder, and FIG. 19 a mounting in use for holding a camera by means of an "Xtension" extension.

The "Cero" mounting shown in FIGS. 1 to 5 can be used, above all, for attachment to round tubes, and finds its use mainly in the sector of action sports/bicycles. This mounting can be installed on all round and oval tubes up to a diameter of 40 mm. In this regard, it is particularly advantageous that the open side of the design can be installed very close to moving bicycle parts (wheels, spokes). Interchangeable bracing jaws made of plastic allow use on different tube diameters. The mounting is therefore particularly characterized by the following:

The clamping element 2 and the mating piece 3 are produced from CNC-milled aluminum. The mounting 1 essentially consists of the clamping element 2 and the mating piece 3, into which different plastic inserts 4, 5, optimized for different profiles, can be inserted.

The plastic inserts 4, 5 enclose the object on which the holder is installed, and are fixed in place by a rotational screw 6 of a bracing device 13. The mounting 1 is suitable for objects having a diameter of 10-40 mm and has a support 7 on which a camera can be attached. Due to the small dimension of the mounting, installation in tight situations is possible for all common action camera systems (e.g. between wheel and fork of a bicycle). In this way, particularly unusual perspectives are possible while filming. The mounting can be supplied as a set, as standard equipment, including a hard shell case, with extensive accessories, such as, in particular, different plastic inserts.

FIG. 2 shows how different plastic inserts 4 to 9 can be inserted into the clamping element 2 and the mating piece 3, in latching and shape-fit manner, and are held there with two nubs 10 and 11. These clamping jaws 4, 5 are produced from a two-component material, so that on the one hand, they can easily be inserted into the basic body, locking in place, and, on the other hand, so that they hold an object with a preferably more stable region part. In this regard, the softer part also acts as equalization, in order to allow optimal contact of the harder part of the bracing jaw on the basic body.

The clamping element 2 and the mating piece 3 therefore each have a shape-stable basic body 11, 12, which bodies can be moved toward one another by way of the bracing device 13, and between which there is a free space 14, which is delimited by two plastic inserts 4, 5, which serve as bracing jaws. The bracing device is configured in such a manner that the clamping element 2 and mating piece 3 are moved toward one another on a straight line 15 that leads through the center of the space 14.

The "Quattro" mounting 20 shown in FIGS. 3 and 4 consists of four aluminum parts 21 to 24, which are connected using screws 25, 26 (numbered only as examples). Installation on angular or round attachment points is therefore possible in extremely effective manner. This mounting 20 is intended for permanent installation, to the greatest possible extent. By means of different fixtures, adaptation of a camera attachment and other system components is possible here, as well. The mounting is therefore particularly characterized by the following:

The clamping elements and mating pieces 27 to 30 are produced from CNC-milled aluminum. The mounting consists of four individual elements (A, B, C, D), which are connected by means of threaded screws of different lengths.

Lying on the inside are interchangeable inserts made of plastic, as bracing jaws 31 to 34, which are adapted to different profiles (square, round, oval). With these, there are interchangeable camera inserts 35, 36, 37 for all common action camera systems. Tremendous hold occurs as the result of the "all-around attachment." Installation on profiles having a large diameter (10-100 mm) is possible in problem-free and reliable manner, because of the variable design. Because of the variable connection by means of threaded screws 25, 26 of different lengths, it is also possible to process rectangular or narrow-oval profiles, without problems. A set allows standard delivery, including hard shell case and extensive accessories, such as, in particular, different bracing jaws 38 to 41.

The "Zwanziger" mounting 50 shown in FIGS. 5 to 7 has been specifically developed for the sector of winter sports and is ideally suited for installation on ski poles having a diameter of 10-20 mm. It can also be used on cables and ropes.

A cam 51 is used, which is clamped in a corresponding accommodation 52 by means of a 180° movement and produces bracing. The mounting 50 is therefore particularly characterized by the following:

The mating piece 53 formed by the cam 51 has a roller 58 composed of elastic rubber material, and acts together with the u-shaped clamping element 57 composed of CNC-milled aluminum. It is particularly suitable for installation on round profiles (10-20 mm). It has interchangeable camera inserts 54 for all common action camera systems. Affixing it to ski poles and cables is possible because of the slight dimensions and the tremendous hold that results from the design, without any interference with the mounting 50. The mounting is set onto the rod, pole, cable. The clamping element 53 is inserted, pivoted by approximately 180°, and pressed downward by a lever function and guidance of the axle 58 on the curve 57. In this regard, the cam 51 presses against the pole or the cable, on which the cam 51 rolls as the clamping element 53 is pivoted. As a result, the holding pressure occurs. A hook-shaped accommodation 55 holds the clamping element 53 in the clamped state. The function is shown in FIG. 7, using the example off a cable 56. As a result, very fast and reliable installation is possible. For attachment to different cable diameters or rod diameters, different inserts are set into the u-shaped clamping element 57. Delivery takes place in standard manner, including hard shell case and extensive accessories.

In the case of the "Big T" mounting 60 shown in FIGS. 8 to 12, grooves 63 were introduced into the individual links 61 of a link belt 62, which grooves were provided with an insulation rubber 64. As a result, more adhesion and additional protection of the surfaces of an object 65 in which the mounting 60 is attached are achieved. The individual links 61 are connected by means of closure bolts 66.

The system includes pressure pieces 67 to 72, which are inserted into the rear housing 73, into two recesses 74 and 75, as bracing jaws. In this way, the mounting can be adapted to different diameters. The closure 76 is laid into the front part 77 and can be held in different positions there. The pressure pieces 67 to 72 are either locked in place or attached with two screws. However, they can also be laid in loosely.

The mounting 60, with the links 61 and the housing 73, with the pressure pieces 67 to 72, forms a clamping element and a mating piece that is formed by one or two chain links. The links and the housing are produced from CNC-milled aluminum. The housing 73 has a ball socket 78 for accommodation of a support 79 of a camera (see FIG. 19). The support 79 has a ball not visible), which lies in the ball socket 78 and can be attached there. The mounting 60 is suitable for diameters from 10-70 mm and has interchangeable supports 79 for camera inserts for all common action camera systems. Because of the slight depth of the mounting, and the fact that there is no bracing lever or the like, installation in tight situations is Possible (e.g. roll bar or steering lever of a motorcycle). As a result, unusual perspectives are possible while filming. Standard delivery takes place including hard shell case as well as extensive accessories.

This mounting system therefore has an armored chain belt 62 and at least one bracing pressure screw 80 to 83, which presses the pressure pieces against an object 65. The armored chain belt has connection bolts and chain links, and silicone-rubber molded parts are disposed on the inside of the chain links. It is advantageous if the connection bolts 66 are produced from brass. In this regard, it is preferably provided that the connection bolts 66 have an effective diameter of about 3 mm. The chain links 61 should be produced from aluminum, and the armored chain belt should have an inner contact surface 84, on which the silicone-rubber molded parts 64 are disposed in such a manner that the chain can enclose a body without contact occurring between the chain links 61 or the bolts 66 and the body. Preferably, the silicone-rubber molded parts 64 are attached to the chain links 61 with shape fit. It is advantageous if a molded body 67 to 72 having a notch 85 is disposed on the inside of the bracing pressure screw, and it is particularly preferred if two molded bodies 67, 68 are disposed on the inside of the bracing pressure screw 80 to 83. In this regard, at least one molded body should be displaceable toward the housing 73 by means of the bracing pressure screw. In order to securely hold objects having different diameters at the same belt length, it is thereby proposed that the bracing pressure screw is disposed on a bracing chain link into which different molded bodies can be inserted.

FIG. 13 shows a "Shark" mounting 90, in which the clamping element 91 interacts with the mating piece 92. In this regard, the contact surface 93 always lies opposite the contact surface 94 of the clamping element, even when the mating piece 92 is pivoted. The contact surface 94 is configured as an angular surface, in order to accommodate an object (not shown), which is pressed into the angular surface by the opposite contact surface 93. The bracing screw, which acts on the mating piece 92 and is attached to the clamping element 91, serves for this purpose.

A "Proflex" mounting 100 is shown in FIG. 14. Here, a support 102 is displaceably threaded onto a serrated band 103, as a camera holder. Multiple supports can also be threaded onto the band. The mating piece 102 lies opposite the part 101, which acts as a clamping element; the band 103 is attached to this piece and it has a ratchet mechanism 104 in order to brace the end 105 against the beginning 106 of the band 103, using the lever 107.

The "iSHOXS" mounting 120 shown in FIG. 15 has a clamping element 121 and a mating piece 122, which are tightened against one another by means of screws (not shown). Both elements have inserts 123 and 124, which are held with shape fit in the clamping element 121 and in the mating piece 122. For this purpose, the inserts have projections 125 to 128, which are produced from a softer material than the clamping element and the mating piece, which are preferably produced from aluminum. The contact surface 129 and 130 to the object (not shown) to be clamped is preferably produced from a material that in turn is harder than the material of the projection 125 to 128.

If a not quite round object or an object that does not quite fit into the bend of the contact surfaces 129 and 130 is supposed to be held with the mounting 120, the softer material is displaced between the material of the clamping element 121 and mating piece 122 and the contact surfaces 129 and 130 when the mounting is braced. The softer material essentially maintains its position because of the projections, and can simultaneously give way, so that the object is optimally surrounded and held by the contact surfaces.

The mounting 140 shown in FIGS. 16 to 18 is an "M1" suction cup mounting. A significant difference from other suction cup holders is an additional flexible release tab 141. The mounting is therefore particularly characterized by a vacuum suction holder 142 with a silicone membrane, which serves as a suction cup 143, and a basic body 144 composed of CNC-milled aluminum. It adheres securely to all smooth surfaces such as, for example, windows, engine hoods, snowboards, and surfboards. It has great adjustability of the camera accommodation 145, thereby resulting in the best perspective adaptations. It has interchangeable camera inserts 146 for all common action camera systems. The holder 140 is pressed onto the surface and securely locked in place by means of a clamping lever 147 that is pressed downward. The side of the basic body 144 that faces the silicone membrane can be milled with little "teeth" (not shown), which adhere in the membrane, in order to guarantee particularly secure hold of the design during use, in that rotation or displacement of membrane and basic body are prevented by the friction increased by the teeth.

The "Xtension" shown in FIG. 19, extension 160, is a three-element design, which is introduced into the ball socket of a holder 161 and once again increases the creative and mechanical scope of the user by means of its individual adjustment, which is possible at every joint 162, 163, and 164. Furthermore, the Xtension 160 can also be adjusted at the ball in the ball socket on the holder 161.

The clamping jaws that come into contact with the object can be produced from different materials in the case of all the mountings. In this regard, a harder material preferably faces the object and a softer material serves for contact with the basic body. However, a harder material can also be used for the preferably shape-fit and/or latching connection with the basic body, while a softer material lies against the object. Preferably, a two-component material is used.

The invention claimed is:

1. A holding system for fastening electrical devices having a clamping element and a counterpart piece which in each case have a base body and are fastened to one another such that they can be moved towards one another and between which there is a free space, in which an object can be arranged, wherein the holding system is configured in such a manner that during a clamping process, the clamping element and the counterpart piece are moved towards one another on a straight line that leads through the center of the space,
   wherein the counterpart piece is formed by at least one chain link of an armored chain strap with a silicone-rubber molded part arranged thereon,
   wherein the armored chain strap has chain links connected with bolts, and an inner bearing surface, on which the silicone-rubber molded parts are arranged in such a manner that the chain strap can encompass a body, without contact occurring between the chain links of the armored chain strap or a bolt and the body, and
   wherein the clamping element has a clamping element base body on which a clamping jaw is arranged.

2. The holding system according to claim 1, wherein the clamping jaw has a two-component material.

3. The holding system according to claim 1, wherein the clamping jaw has silicone or silicone-rubber.

4. The holding system according to claim 1, wherein the base body is produced from aluminum.

5. The holding system according to claim 1, wherein the armored chain strap has individual replaceable chain links.

6. The holding system according to claim 1, wherein the clamping element has a clamping screw.

7. The holding system according to claim 1, wherein the clamping element has an eccentric.

8. The holding system according to claim 7, wherein the eccentric has an elastic rubber material.

9. The holding system according to claim 1, wherein the holding element has an extension for insertion into the clamping element, wherein the extension has a ball that is affixed in a ball socket of a holder, and the extension has elements that are connected with one another by way of joints, and wherein the joints can be fixed in a desired position in each case.

10. The holding system according to claim 9, wherein the elements of the extension are adjustable in all three spatial directions.

11. The holding system according to claim 9, wherein the extension has exactly three elements.

\* \* \* \* \*